United States Patent
Morrow et al.

[19]

[11] Patent Number: 5,946,430
[45] Date of Patent: Aug. 31, 1999

[54] SWITCHABLE WAVELENGTH ADD/DROP COMPONENT

[75] Inventors: Alan John Morrow, Elmira, N.Y.; Richard Roth, Boulder, Colo.

[73] Assignee: Corning Incorporated, Corning, N.Y.

[21] Appl. No.: 08/905,515

[22] Filed: Aug. 4, 1997

[51] Int. Cl.$^6$ .................................................. G02B 6/28
[52] U.S. Cl. ........................ 385/24; 385/10; 385/16; 385/37; 385/47; 359/127; 359/130
[58] Field of Search ................... 385/24, 10, 15, 385/16, 18, 17, 37, 47, 31; 359/114, 124, 127, 130, 168, 169, 170

[56] References Cited

U.S. PATENT DOCUMENTS

| | | |
|---|---|---|
| 4,860,294 | 8/1989 | Winzer et al. . |
| 5,026,137 | 6/1991 | Tokumitsu . |
| 5,283,686 | 2/1994 | Huber . |
| 5,410,624 | 4/1995 | Morkel . |
| 5,426,297 | 6/1995 | Dunphy et al. ..................... 250/227.23 |
| 5,446,809 | 8/1995 | Fritz et al. ................................ 385/17 |
| 5,579,143 | 11/1996 | Huber ...................................... 359/130 |
| 5,600,473 | 2/1997 | Huber . |

*Primary Examiner*—Phan Palmer
*Attorney, Agent, or Firm*—William Greener

[57] ABSTRACT

A device for adding and/or dropping a signal to a transmission line. First and second optical circulators are connected by at least one switchable grating reflector, whereby a grating reflector can be switched into or out of the connecting path between the two circulators. A plurality of optical signals, each centered about a different wavelength, is coupled to a first port of the first circulator; these signals appear at the second port thereof. If a grating reflector capable of reflecting $\lambda_i$ is switched into the circuit, the signal centered about $\lambda_i$ propagates from the second port of the first circulator and reflects from the grating reflector back into the second port and out of the third port. The remainder of the input signals that are not reflected by grating reflectors propagate into the first port and from the second port of the second circulator as an output thereof. Also, a signal at wavelength $\lambda_i$ input to the third port of the second circulator propagates from the first port to the grating reflector where it reflects back to the second circulator and appears at the second port as an output thereof.

19 Claims, 3 Drawing Sheets

SWITCHABLE WAVELENGTH ADD/DROP COMPONENT

BACKGROUND OF THE INVENTION

The present invention relates to an optical signal processor for dropping from or adding to an optical transmission line a signal at any one of a plurality of specific wavelengths.

In dense wavelength division multiplexer (WDM) optical transmission systems a multiplicity of optical signals is transmitted, each at a different wavelength. One or more of the signals is dropped off and/or added at a system node. The component forming the node should add as little loss as possible to the system, be highly reliable, and be actively switchable. It is also desirable that one or any combination of wavelengths be added or dropped at each node. Such components would be extremely useful for the 1530–1560 nm Er amplification passband.

It is well known that an add/drop multiplexer/demultiplexer (A/D M/D) component 10 can be fabricated by assembling a Bragg grating (BG) device 12 tuned to the desired wavelength $\lambda_i$ with two circulators 14, 16 as shown in FIG. 1. Bragg grating devices can be implemented in various forms including fiber and planar devices. Each of the circulators described herein includes ports 1, 2 and 3. The circulators can be replaced by 3 dB couplers as discussed below. Component 10 receives a composite group of signals of different wavelengths $\lambda_a$–$\lambda_k$ on input line 11 and provides the desired multiplexed signal of wavelength $\lambda_i$ on WDM output line 18. The term "line" is used to mean optical fiber or planar optical path, depending upon how the component is constructed. The remaining signals from line 11, except for that at wavelength $\lambda_i$, are transmitted to output line 20. An input signal of wavelength $\lambda_i$ that appears at line 19 is combined with those remaining signals at output line 20. However, component 10 is not switchable. It can be made to drop multiple wavelengths by adding additional gratings between the circulators, but signals at all wavelengths that are reflected by the gratings must be dropped at the WDM output line 18.

SUMMARY OF THE INVENTION

It is therefore an object of the present invention to provide an optical component for selectively dropping at a transmission line node a signal at a specific wavelength $\lambda_i$, or allowing the signal at wavelength $\lambda_i$ to continue to propagate along the transmission line without being dropped.

Briefly, the present invention relates to an optical signal processing component including first coupling means for coupling at least a portion of an optical signal from a first port to a second port thereof, and for coupling at least a portion of an optical signal from a second port to a third port thereof. An input line applies at least one optical signal to the first port of the first coupling means, the input including at least a signal at a given wavelength. Switching means selectively connects to the third port of the first coupling means at least one grating reflector that is tuned to the given wavelength.

The first coupling means can be a circulator or a coupler. When more than one grating reflector is employed, each is tuned to a different wavelength.

The component can further comprise second coupling means for coupling at least a portion of an optical signal from a first port to a second port thereof and for coupling at least a portion of an optical signal from a third port to a first port thereof. In this embodiment the switching means selec-tively connects the grating reflector between the third port of the first coupling means and the first port of the second coupling means. This embodiment can include an input line for applying an optical signal at the given wavelength to the third port of the second coupling means.

DESCRIPTION OF THE PREFERRED EMBODIMENTS

Figure 2:
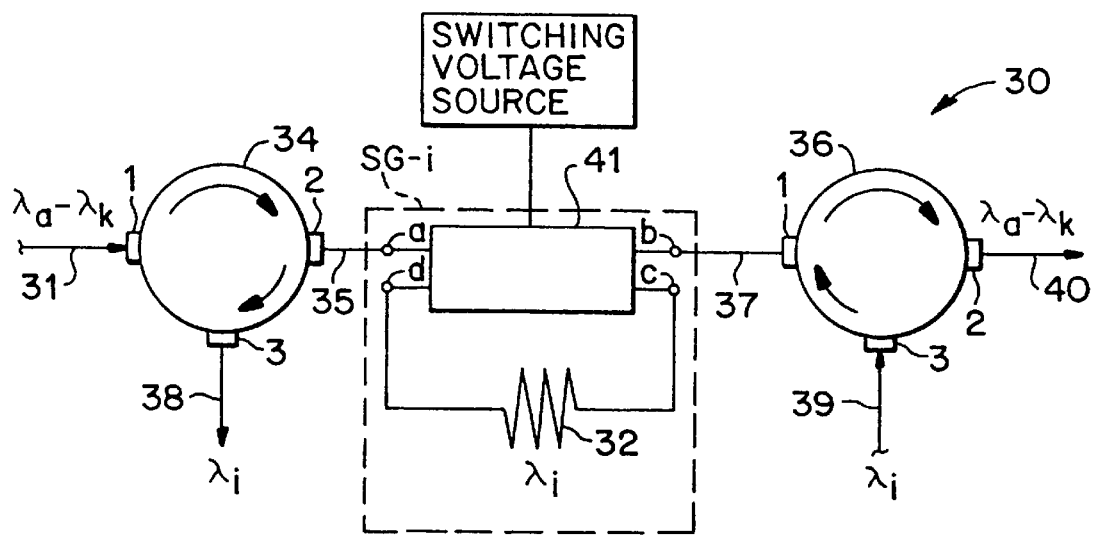
FIG. 2 is a schematic illustration of a switchable WDM A/D M/D component.
Figure 3A:
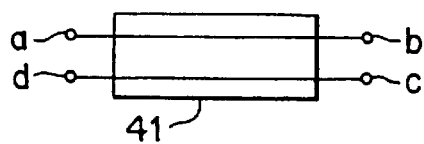
FIGS. 3a and 3b schematically illustrate the bar and cross states, respectively, of the switch of FIG. 2.
Figure 3B:
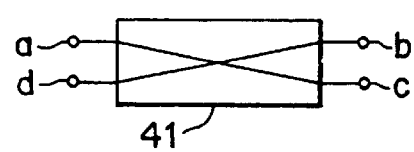

Component 30 of FIG. 2 includes two circulators 34 and 36. Port 2 of circulator 34 is connected to port 1 of circulator 36 by a switchable grating SG-i which includes a switch 41 and BG device 32. Two states of one embodiment of switch 41, the bar state and the cross state, are shown in FIGS. 3a and 3b, respectively.

When switch 41 is in the bar state, all of the signals appearing at input line 31 of component 30 are transmitted to output line 40, since port 2 of circulator 34 is connected directly to port 1 of circulator 36 by way of switch terminals a and b.

Figure 1:
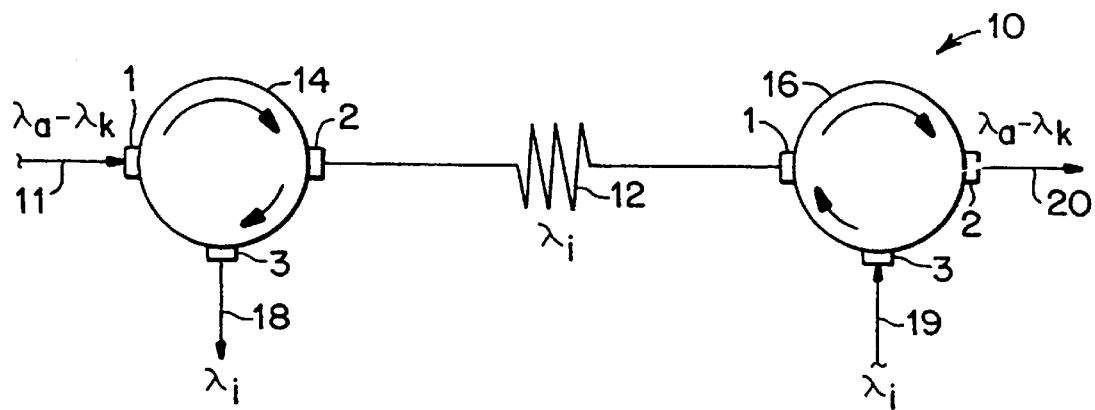
FIG. 1 is a schematic illustration of a prior art WDM A/D M/D component.

When switch 41 is in the cross state, port 2 of circulator 34 is connected by way of switch terminals a and c to one side of BG device 32. The other side of BG device 32 is connected by way of switch terminals d and b to port 1 of circulator 36. Thus, component 30 functions in the manner described in conjunction with FIG. 1 when switch 41 is in the cross state.

When component 30 receives a composite group of signals of wavelengths $\lambda_a$–$\lambda_k$ on input line 31, and switch 41 is in the cross state, the multiplexed signal of wavelength $\lambda_i$ reflects from BG device 32, propagates back to port 2 and from port 3 of circulator 34 and appears on WDM output line 38. The remaining signals from line 31, except for that at wavelength $\lambda_i$, are transmitted through BG device 32 to port 1 and from port 2 of circulator 36 to output line 40. An input signal of wavelength $\lambda_i$ that appears at line 39 propagates into port 3 and from port 1 of circulator 36, and reflects from BG device 32 back to port 1. That input signal propagates from port 2 of circulator 36 and is combined at output line 40 with the remaining ones of the input signals that were applied to input terminal 31 (except for the signal at wavelength $\lambda_i$ that was dropped at line 38).

Figure 4:
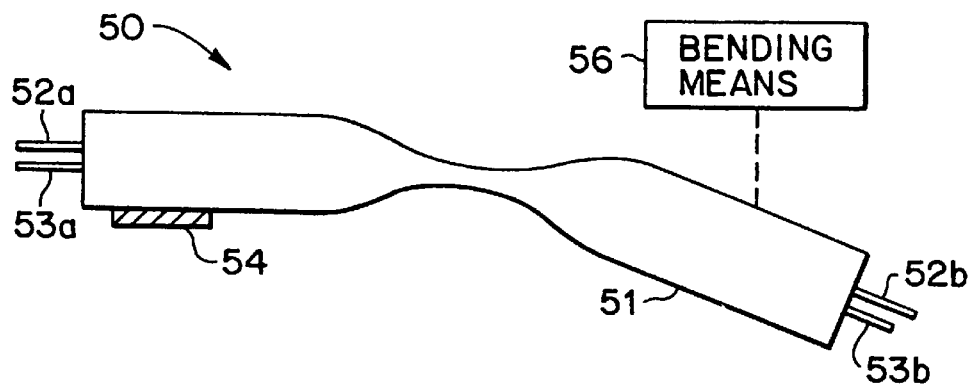
FIGS. 4–6 illustrate different optical fiber switches that can be used in the component of the invention.

Various types of fiber optic switches are capable of performing the function represented in FIGS. 3a and 3b. FIG. 4 shows an overclad fiber optic switch 50 the principles of operation of which are disclosed in U.S. Pat. Nos. 4,763,977 and 5,353,363. Switch 50 includes a WDM fiber optic coupler 51 having two optical fibers. Ends 52a and 52b of one fiber protrude from opposite ends of coupler 51, and ends 53a and 53b of the other fiber protrude from opposite ends of the coupler. Coupler 51 is fixed at one end by means 54, the other end of the coupler being bent by means 56. Electromagnetic, piezoelectric, bimetallic and other types of devices can provide the small, controlled movement that is required for bending the switch. Switch 50 could function such that an optical signal applied to fiber end 52a couples to the other fiber and appears at fiber end 53b (the cross state) when the coupler is unbent. Similarly, a signal applied to fiber end 53a couples to the other fiber and appears at fiber end 52b when the coupler is unbent. When the coupler is bent (the bar state), an optical signal applied to fiber end 52a remains uncoupled and appears at fiber end 52b. Coupler 51 could be deflected to the bent condition by means such as those disclosed in U.S. Pat. Nos. Re. 31,579; 4,204,744; 4,303,302; 4,318,587 and 4,337,995. The rotary action of the switch disclosed in U.S. Pat. No. 5,146,519 is also well suited for switching switch 50; the linear motion of the switch actuating device would simply be converted to rotary motion.

Figure 5:
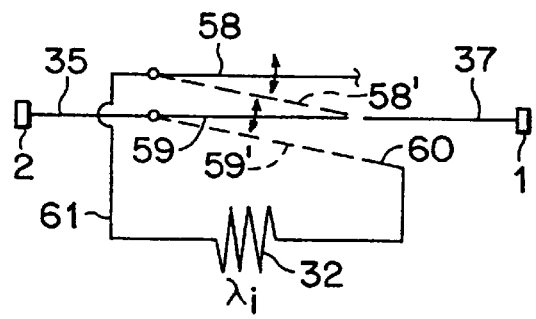

Switch 41 could be constructed in accordance with FIG. 5 where coupling fibers or lines 35 and 37 of FIG. 2 are illustrated for reference purposes. Switchable optical fiber 59, which is connected to line 35, can be switched between lines 37 and 60 as indicated by the double-headed arrow. Similarly, switchable optical fiber 58, which is connected to line 61, can be switched to and away from line 37 to as indicated by the double-headed arrow. In the unswitched state, switchable fibers 58 and 59 are in the position represented by solid lines, and BG 32 is not connected between lines 35 and 37. In the switched state, switchable fibers 58 and 59 are in the position represented by dashed lines 58' and 59'; therefore, BG 32 is connected between lines 35 and 37. Switchable fibers 58 and 59 can be switched between the two illustrated states by means such as those disclosed in U.S. Pat. Nos. Re. 31,579; 4,204,744; 4,303,302; 4,318,587 and 4,337,995.

Figure 6:
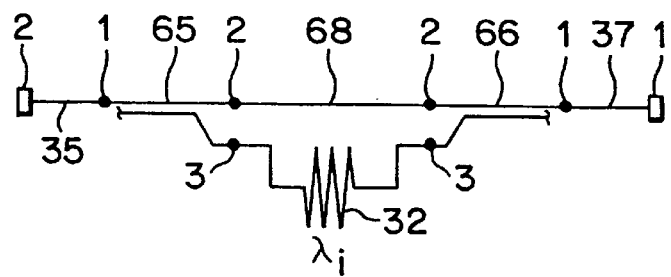

In the switch of the embodiment of FIG. 6 lines 35 and 37 of FIG. 2 are again illustrated for reference purposes. Couplers 65 and 66 are switchable couplers of the type shown in FIG. 4. In their bent state, light does not couple between the two fibers of couplers 65 and 66; therefore, the optical signals from circulator port 2 are coupled to line 37 and circulator port 1 over the couplers and line 68. In the unbent state of the couplers, the optical signals from circulator port 2 are coupled by line 35, coupler 65, BG device 32, coupler 66 and line 37 to circulator port 1.

The switchable couplers of FIG. 6 could be replaced by movable fiber switches as described in conjunction with FIG. 5. Another cross-bar switch suitable for use in the component of this invention is the planar, voltage-controlled switch disclosed in U.S. Pat. No. 4,822,124.

Figure 7:
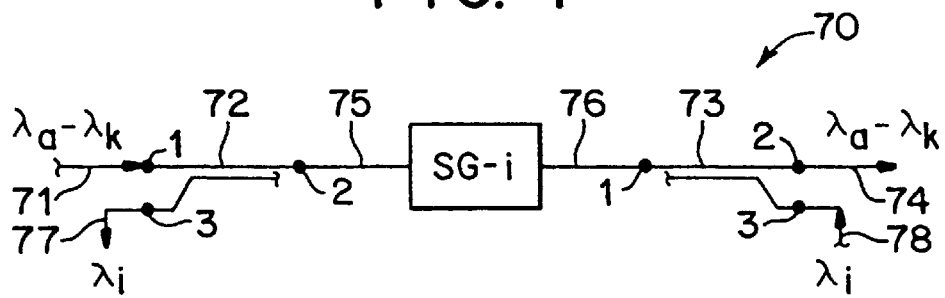
FIG. 7 is a schematic illustration of another embodiment of a switchable WDM A/D M/D component.

The circulators of FIG. 2 could be replaced by 3 dB couplers 72 and 73 as illustrated in FIG. 7. A pluality of signals at wavelengths $\lambda_a$–$\lambda_k$ is received at input line 71 of component 70 and coupled by through ports 1 and 2 of coupler 72 to switchable grating SG-i. If the condition of SG-i is such that the grating is connected between lines 75 and 76, the signal of wavelength $\lambda_i$ is reflected from the grating and coupled through ports 2 and 3 of coupler 72 to output line 77. The remaining input signals from line 71, except that at wavelength $\lambda_i$, are transmitted to output line 74 via SG-i and ports 1 and 2 coupler 73. An input signal of wavelength $\lambda_i$ that appears at line 78 is coupled by ports 3 and 1 of coupler 73 to SG-i where it reflects back to coupler 73 and is coupled through ports 1 and 2 to output line 74.

Depending upon the system in which component 70 is used, an isolator may have to be placed in line 71.

Figure 8:
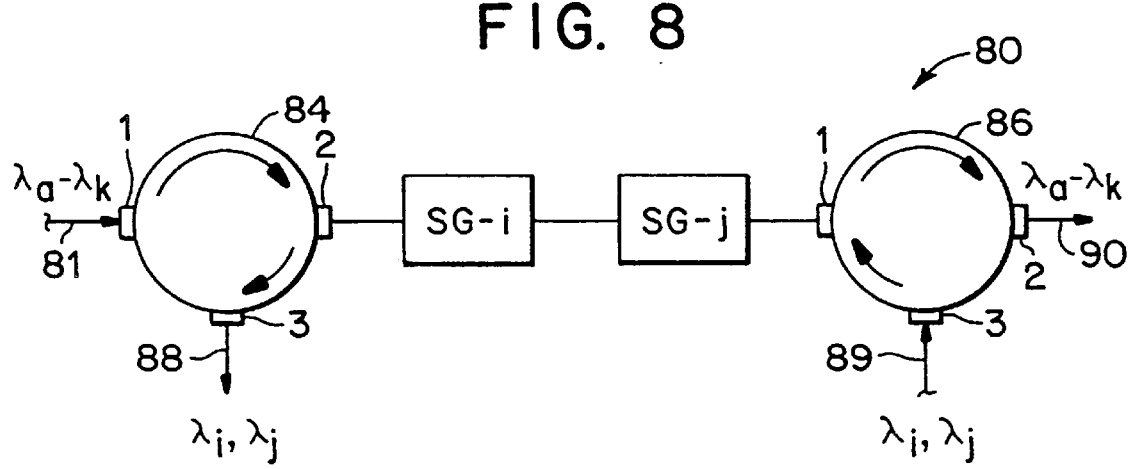
FIG. 8 is a schematic illustration of a switchable WDM A/D M/D component having multiple switched Bragg grating devices.

Any number of wavelengths can be added or dropped at a single node by adding an additional SG unit for each additional wavelength. Referring to FIG. 8, signals of wavelengths $\lambda_a$–$\lambda_k$ are received at input line 81 of component 80. The input signals are coupled by circulator 84 to any desired number of switchable gratings, such as SG-i and SG-j. The last switchable grating is coupled to port 1 of circulator 86. If the BG device of each of the switchable gratings SG-i and SG-j is switched into component 80, then all of the input signals are transmitted to output line 90 except those at wavelengths $\lambda_i$ and $\lambda_j$ which are reflected back to port 2 of circulator 84 and appear at output line 88. If the state of SG-i is changed to remove the grating therein from the component, only the signal at wavelength $\lambda_j$ appears at output line 88.

If the BG device of switchable grating SG-i is switched into the component, an input signal of wavelength $\lambda_i$ that appears at line 89 is coupled to output line 90. Similarly, an input signal of wavelength $\lambda_j$ appearing at line 89 couples to line 90 if the BG device of switchable grating SG-j is switched into the component.

Figure 9:
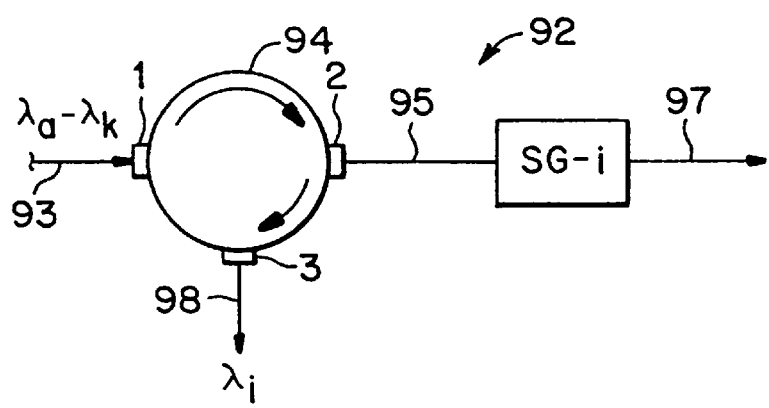
FIG. 9 is a schematic illustration of a component having only one circulator.

As shown in FIG. 9, a component 92 can include a single circulator 94 if the function of the component is to selectively drop one or more predetermined signals. Port 2 of circulator 94 is connected to switchable grating SG-i of the type described above. Signals of wavelengths $\lambda_a$–$\lambda_k$ are received at input line 93 of component 92. If the BG device of switchable grating SG-i is switched into component 92, then all of the input signals are transmitted to output line 97 except that at wavelength $\lambda_i$ which is reflected back from the BG device to port 2 of circulator 94 and appears at output line 98. If the state of SG-i is changed to remove the grating therein from the component, then all of the input signals including that at wavelength $\lambda_i$, appears at output 97.

A component similar to that shown in FIG. 9 can be employed for adding one or more signals to a transmission line.

I/We claim:

1. An optical signal processing component comprising:
    first coupling means having at least first, second and third ports, said first coupling means (a) coupling at least a portion of an optical signal from said first port to said second port, and (b) coupling at least a portion of an optical signal from said second port to said third port,
    an input line for applying at least one optical signal to the first port of said first coupling means, said at least one optical signal including a signal at a given wavelength,
    at least one grating reflector, one of said at least one grating reflectors being tuned to said given wavelength, and
    switching means for selectively connecting said at least one grating reflector to the third port of said first coupling means.

2. A device in accordance with claim 1 further comprising second coupling means having at least first, second and third ports, said second coupling means (a) coupling at least a portion of an optical signal from said first port to said second port, (b) coupling at least a portion of an optical signal from said third port to said first port; said switching means selectively coupling said at least one grating reflector between the third port of said first coupling means and the first port of said second coupling means.

3. A device in accordance with claim 2 wherein said switching means is a cross-bar switch having terminals a, b, c and d, terminals a and b and terminals c and d being interconnected when said switch is in the bar state and terminals a and c and terminals b and d being interconnected when said switch is in the cross state, switch terminal a being connected to port 2 of said first coupling means, switch terminal b being connected to port 1 of said second coupling means, and switch terminals c and d being connected to different terminals of said grating reflector.

4. A device in accordance with claim 3 wherein said cross-bar switch is a switchable fiber optic coupler.

5. A device in accordance with claim 2 further comprising an input line for applying an optical signal at said given wavelength to the third port of said second coupling means.

6. A device in accordance with claim 1 wherein said first coupling means is a coupler.

7. A device in accordance with claim 6 wherein said coupler is a fiber optic coupler.

8. A device in accordance with claim 1 wherein said first coupling means is a circulator.

9. A device in accordance with claim 1 wherein said at least one grating reflector comprises a plurality of grating reflectors, each of which is tuned to a different wavelength.

10. A device in accordance with claim 1 wherein said at least one grating reflector is an in-fiber grating.

11. A device for adding and/or dropping a signal to an optical transmission line, comprising:

first and second coupling means, each having at least first, second and third ports, said first coupling means (a) coupling at least a portion of an optical signal from said first port to said second port, and (b) coupling at least a portion of an optical signal from said second port to said third port, said second coupling means (a) coupling at least a portion of an optical signal from said first port to said second port, and (b) coupling at least a portion of an optical signal from said third port to said first port, at least one grating reflector tuned to a given wavelength, and switching means for selectively connecting said at least one grating reflector between the third port of said first coupling means and the first port of said second coupling means.

12. A device in accordance with claim 11 wherein said switching means is a cross-bar switch having terminals a, b, c and d, terminals a and b and terminals c and d being interconnected when said switch is in the bar state and terminals a and c and terminals b and d being interconnected when said switch is in the cross state, switch terminal a being connected to port 2 of said first coupling means, switch terminal b being connected to port 1 of said second coupling means, and switch terminals c and d being connected to different terminals of said grating reflector.

13. A device in accordance with claim 12 wherein said cross-bar switch is a switchable fiber optic coupler.

14. A device in accordance with claim 11 wherein said first and second coupling means are couplers.

15. A device in accordance with claim 14 wherein said couplers are fiber optic couplers.

16. A device in accordance with claim 11 wherein said first and second coupling means are circulators.

17. A device in accordance with claim 11 wherein said at least one grating reflector comprises a plurality of grating reflectors, each of which is tuned to a different wavelength.

18. A device in accordance with claim 11 wherein said at least one grating reflector is an in-fiber grating.

19. A device for adding and/or dropping a signal to an optical transmission line, comprising:

first and second optical circulators, each having at least first, second and third ports, said first coupling means (a) coupling at least a portion of an optical signal from said first port to said second port, and (b) coupling at least a portion of an optical signal from said second port to said third port, said second coupling means (a) coupling at least a portion of an optical signal from said first port to said second port, (b) coupling at least a portion of an optical signal from said third port to said first port, at least one grating reflector for reflecting an optical signal centered about a single wavelength while not reflecting optical signals centered about other wavelengths, and a switchable fiber optic coupler for selectively coupling said at least one grating reflector between the third port of said first circulator and the first port of said second circulator.

\* \* \* \* \*